(12) United States Patent
Cohen et al.

(10) Patent No.: US 7,664,147 B2
(45) Date of Patent: Feb. 16, 2010

(54) PHASE MATCHING OF HIGH ORDER HARMONIC GENERATION USING DYNAMIC PHASE MODULATION CAUSED BY A NON-COLLINEAR MODULATION PULSE

(75) Inventors: Oren Cohen, Boulder, CO (US); Henry C. Kapteyn, Boulder, CO (US); Margaret M. Murnane, Boulder, CO (US)

(73) Assignee: Rugents of the University of Colorado a body corporate, Denver, CO (US)

( * ) Notice: Subject to any disclaimer, the term of this patent is extended or adjusted under 35 U.S.C. 154(b) by 0 days.

(21) Appl. No.: 12/002,523

(22) Filed: Dec. 17, 2007

(65) Prior Publication Data

US 2008/0144672 A1 Jun. 19, 2008

Related U.S. Application Data

(60) Provisional application No. 60/875,175, filed on Dec. 15, 2006.

(51) Int. Cl.
*H01S 3/30* (2006.01)
(52) U.S. Cl. .................. 372/5; 372/22; 372/30
(58) Field of Classification Search ............ 372/22, 372/30, 225
See application file for complete search history.

(56) References Cited

U.S. PATENT DOCUMENTS 6,151,155 A 11/2000 Durfee, III et al.

2008/0137696 A1* 6/2008 Zhang et al. .............. 372/22

OTHER PUBLICATIONS

Peatross et al. (submitted IDS NPL document: Selective zoning of high harmonic emission using counter-propagating light; Optic Express, vol. 1, No. 5, 1997).*
Shkolnikov, A. et al., Optimal Quasi-Phase-Matching for High-Order Harmonic Generation in Gases and Plasmas, Physical Review A, Dec. 1994, pp. R4461-R4464, vol. 50, No. 6.
Milchberg, H. M. et al., High-Order Frequency Conversion in the Plasma Waveguide, Physical Review Letters, Sep. 1995, pp. 2494-2497, vol. 75, No. 13.
Rundquist, A. et al., Phase-Matched Generation of Coherent Soft X-Rays, Science, May 1998, pp. 1412-1415, vol. 280.

(Continued)

*Primary Examiner*—Dung T Nguyen
(74) *Attorney, Agent, or Firm*—Jennifer L. Bales; Macheledt Bales & Heidmiller LLP

(57) ABSTRACT

Phase matching high harmonic generation (HHG) uses a single, long duration non-collinear modulating pulse intersecting the driving pulse. A femtosecond driving pulse is focused into an HHG medium (such as a noble gas) to cause high-harmonic generation (HHG), for example in the X-ray region of the spectrum, via electrons separating from and recombining with gas atoms. A non-collinear pulse intersects the driving pulse within the gas, and modulates the field seen by the electrons while separated from their atoms. The modulating pulse is low power and long duration, and its frequency and amplitude is chosen to improve HHG phase matching by increasing the areas of constructive interference between the driving pulse and the HHG, relative to the areas of destructive interference.

25 Claims, 3 Drawing Sheets

OTHER PUBLICATIONS

Durfee III, C. G. et al., Phase Matching of High-Order Harmonics in Hollow Waveguides, Physical Review Letters, Sep. 1999, pp. 2187-2190, vol. 83, No. 11.

Peatross, J. et al., Intensity-Dependent Phase-Matching Effects in Harmonic Generation, Journal of Optical Society of America B, May 1995, pp. 863-870, vol. 12, No. 5.

Peatross, J. et al., Selective Zoning of High Harmonic Emission Using Counter-Propagating Light, Optics Express, Sep. 1997, pp. 114-125, vol. 1, No. 5.

Voronov, S. L. et al, Control of Laser High-Harmonic Generation with Counterpropagating Light, Physical Review Letters, Sep. 2001, pp. 133902-1-133902-4, vol. 87, No. 13.

Christov, Ivan P., Enhanced Generation of Attosecond Pulses in Dispersion-Controlled Hollow-Core Fiber, Physical Review A, Oct. 1999, pp. 3244-3250, vol. 60, No. 4.

Christov, I. P. et al., Quasi-Phase Matching of High-Harmonics and Attosecond Pulses in Modulated Waveguides, Optics Express, Nov. 2000, pp. 362-367, vol. 7, No. 11.

Gibson, E. A. et al., Coherent Soft X-Ray Generation in the Water Window with Quasi-Phase Matching, Science, Oct. 2003, pp. 95-98, vol. 302.

Madsen, J. B. et al, High-Order Harmonic Generation in Crossed Laser Beams, Journal of Optical Society America B, Jan. 2003, pp. 166-170, vol. 20, No. 1.

* cited by examiner

PHASE MATCHING OF HIGH ORDER HARMONIC GENERATION USING DYNAMIC PHASE MODULATION CAUSED BY A NON-COLLINEAR MODULATION PULSE

PRIORITY

This application claims benefit of U.S. Provisional Patent Application No. 60/875,175, filed Dec. 15, 2006.

U.S. patent application Ser. No. 11/888,916 is incorporated herein by reference.

GOVERNMENT SUPPORT

The present invention was made with the support of the U.S. government, which may have certain rights in this invention. Funding was provided by two sources: U.S. Department of Energy grant # DE-FG52-06NA26151, and The National Science Foundation grant # EEC0310717.

BACKGROUND OF THE INVENTION

1. Field of the Invention

The present invention relates to phase matching in high harmonic generation (HHG) using a non-collinear pulse to modulate the field seen by the driving pulse. In particular, the present invention relates to such phase matching using a weak, long duration non-collinear modulation pulse intersecting the driving pulse.

2. Description of the Prior Art

High-order harmonic generation (HHG) driven by ultrashort laser pulses is a source of extreme-ultraviolet and soft X-ray light with the unique properties of ultrashort pulse duration and high spatial and temporal coherence. This source has made possible new ultrafast spectroscopic probes of atoms, molecules and materials. So far, however, most applications have used relatively long wavelengths, because the conversion rapidly decreases at shorter wavelengths. This decrease is not due primarily to the very high-order nonlinearity of the process—in fact, the atomic physics of HHG is non-perturbative, and has favorable scaling to shorter wavelengths. The major challenge is that, unlike low-order nonlinear processes such as second-harmonic generation, HHG is inherently associated with ionization of the nonlinear medium. In HHG, an electron is first ionized by the field of an intense femtosecond laser. Once free, the electron begins to oscillate in response to the laser field. A small fraction of the ionized electron can re-collide with its parent ion, recombining and liberating the excess energy as a short-wavelength photon.

As in all nonlinear parametric processes in nature, efficient conversion of light from one frequency to another using nonlinear optics requires that the process be phase-matched. As the pump beam propagates, the nonlinear response of the medium coherently adds to the harmonic signal. The generated field continues to add constructively if the two waves travel with the same phase velocity through the medium, leading to a bright, phase-matched beam at the new wavelength. If the process is not phase-matched, coherent build-up is limited to a propagation distance over which the relative phase of the fundamental and the harmonic light slip by 180°. This distance is the coherence length $L_c = \pi/\Delta k$, where $\Delta k$ is the phase mismatch between the polarization wave and the harmonic wave. For HHG, dispersion of the free-electron plasma reduces $L_c$ to the micrometer or even sub-micrometer range for up-conversion to very short wavelengths, which are only generated when the laser is very intense and thus the medium is already highly ionized. As a result, efficient harmonic generation is possible only at relatively low levels of ionization, below a 'critical' ionization level of around 5% for Argon or around 0.5% for helium, corresponding to photon energies of around 50 eV and around 130 eV respectively. Thus, new methods that can correct for this phase mismatch in ionized media (plasmas) are a 'grand challenge' in this area of laser science.

In the absence of phase-matching, quasi-phase matching (QPM) techniques have been successfully demonstrated to compensate for this phase slip by periodically readjusting the relative phase of the fundamental and nonlinear response at an interval corresponding to the coherence length. In the visible region, this is achieved by periodically reversing the polarization of a non-centrosymmetric nonlinear-optical material. However, this implementation cannot be used for HHG, because HHG uses a low-pressure gas as the nonlinear medium.

Past experimental work used a periodically modulated hollow waveguide to modulate the intensity of the driving laser to implement QPM for high-harmonic generation. U.S. Pat. No. 6,151,115, incorporated herein by reference, is a useful background reference. Even a small modulation (around 1%) of the driving laser results in significant modulation in both the amplitude and phase of the harmonics. Although this past work succeeded in enhancing conversion efficiency into the soft X-ray region of the spectrum by about one order of magnitude, further optimization will require a more sophisticated approach. This is because optical loss of the driving laser, refraction, mode beating and group-velocity dispersion all result in a continuous variation of the coherence length along the direction of propagation, making it difficult to optimize the modulation period. Finally, modulation periods shorter than the waveguide diameter will not significantly influence the laser field, making it challenging to compensate for very short coherence lengths.

Recently, Voronov et al. demonstrated that a weak counterpropagating pulse can be used to disrupt high-harmonic emission, with the objective of using this technique to implement QPM. This experiment used a simple focused-beam geometry in a low-pressure gas. The counterpropagating field induced both a standing amplitude and phase modulation on the driving laser field. Even though the counterpropagating field was weak, it distorted the field of the driving laser, essentially turning off phase-coherent high-harmonic production in the region where the two pulses overlapped. That work also demonstrated that if the HHG signal is deliberately suppressed by a non-optimum focusing geometry, a single counterpropagating pulse can recover much of the original harmonic signal that had previously been obtained in the optimum-focus geometry. However, this work only investigated harmonic emission in regimes where conventional phase-matching was already possible in the medium. Attempts to obtain enhancements significantly greater than what could otherwise be obtained were not successful.

A pending U.S. patent application having some co-inventors with the present application teaches a technique for quasi-phase matching and quantum control of high harmonic generation in waveguides using a train of counterpropagating pulses. The counterpropagating pulse technique presents an advantage over previous QPM techniques in that varying the format of the counterpropagating light pulse allows for dynamic optimization of quasi-phase matching, and also because when short counterpropagating light pulses are used, shorter coherence lengths can be compensated for compared with using a structured waveguide. In this QPM technique, the counterpropagating pulses intersect with the driving pulse and suppress the HHG emission from out-of-phase regions. However, our calculations showed (OL 32, 2975) that the QPM efficiency factor in this technique is smaller than 0.15 (the QPM efficiency factor is the ratio between the generated signal under QPM and the generated signal under perfect phase matching condition). Thus, a need remains to devise a QPM method for HHG with larger QPM efficiency factor. In addition, the counterpropagating pulses QPM technique is limited to the case where the coherence length is larger than ~10-100 microns. At keV energies, however, the coherence length is typically in the micron range.

A need remains in the art for a method of phase matching high harmonic generation (HHG) using one or more non-collinear modulating pulses intersecting the driving pulse that can be implemented using light pulses with duration $>L_c$, and that allows for a maximum QPM efficiency factor.

SUMMARY OF THE INVENTION

An object of the present invention is to provide a method of phase matching high harmonic generation (HHG) using long duration non-collinear modulating pulses that intersect with the driving pulse.

The HHG phase matching method of comprises the steps of: providing a volume filled with a gas, for example a noble gas such as argon, focusing a femtosecond (note that "femtosecond pulse" is defined herein to include pulses from a fraction of a femtosecond to a plurality of femtoseconds, i.e. what is termed in the field an "ultrashort light pulse") driving pulse into the gas to cause high-harmonic generation (HHG), for example in the X-ray region of the spectrum, via electrons separating from and recombining with gas atoms, and providing a long duration non-collinear pulse to intersect the driving pulse and modulate the field seen by the electrons while separated from their atoms. The modulating pulse is low power and long duration (many times longer than the coherence length of the conversion process absent the modulating pulse), and its frequency and amplitude is chosen to improve HHG phase matching by increasing the areas of constructive interference between the driving pulse and the HHG, relative to the areas of destructive interference.

The volume may comprise a hollow cylindrical waveguide, a planar waveguide, or a free-space configuration (albeit enclosed to contain the HHG medium). It is often convenient to use a counterpropagating modulating pulse to provide sufficient interaction between the driving and modulating pulses.

While the counterpropagating pulse is a long duration pulse (for example extending the length of the waveguide), it is advantageous to modulate the amplitude and wavelength of the pulse as it progresses (for example via pulse shaping). The intensity of the modulating pulse can be quite small—for example less than $10^{10}$ W/cm$^2$, or $10^{-6}$ of the intensity of the driving pulse. Even though the modulating pulse is very long, its energy is still as little as 1/10 of that of the driving pulse, while resulting in many orders of magnitude increase in the x-ray yield. More than one modulating pulse may be used to fine-tune the response, but a single pulse of sufficient duration produces dramatic improvements.

The driving pulse is intense and short—preferably femtoseconds in duration.

DETAILED DESCRIPTION OF THE PREFERRED EMBODIMENT

Figure 1:
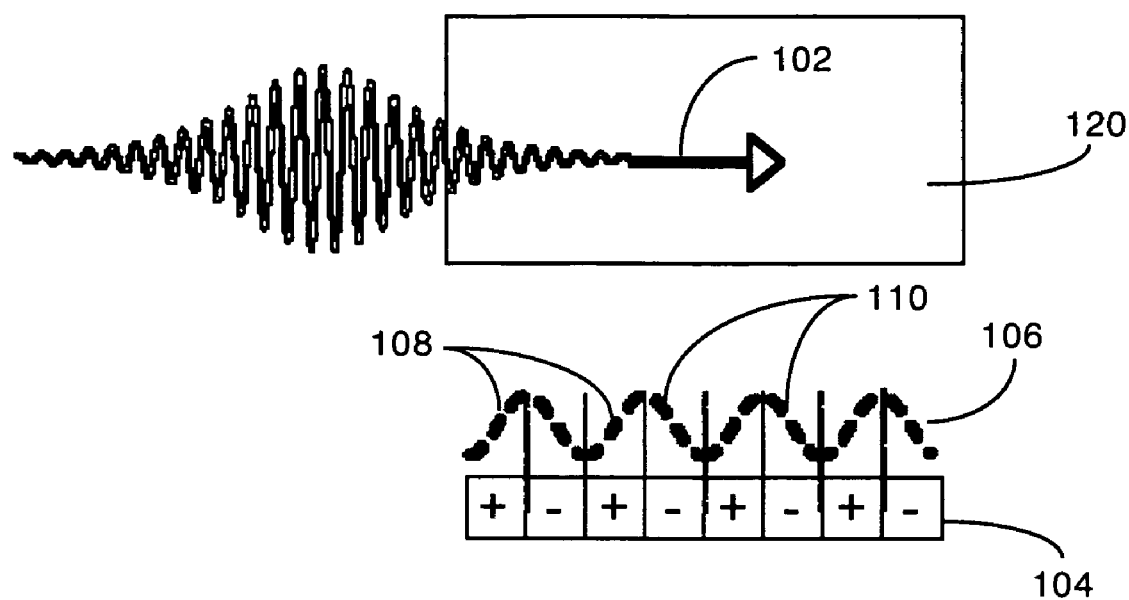
FIG. 1 (Prior Art) is a schematic diagram illustrating high-harmonic emission generation (HHG) in without phase matching.

FIG. 1 (Prior Art) is a schematic diagram illustrating high-harmonic emission generation (HHG) without phase matching. Driving pulse 102 comprises a femtosecond laser pulse, which enters the HHG medium 120. Diagram 104 indicates the regions within the HHG medium in which constructive and destructive interference of HHG emissions will occur, due to the short coherence length of the HHG beam. The areas indicated by a plus (+) are areas of constructive interference, while the areas indicated by a minus (−) are areas of destructive interference. The length of one positively interfering area (+) in the absence of a modulating pulse is one coherence length.

Briefly, an ultrashort light pulse 102 is focused into a medium 120 (for example a noble gas) to generate high-order harmonics 106 in the vacuum-ultraviolet to x-ray regions of the spectrum (generally termed "x-ray HHG" herein). However, particularly for conversion to very short wavelengths, the high-harmonic process is not well phase-matched, for a variety of reasons. The most significant is usually the presence of a plasma, generated either through pre-ionization of the medium or through the intense laser-matter interaction itself, that affects the speed of propagation of the driving laser pulse 102. The "polarization" of the medium follows the propagation of the driving laser pulse, while the generated signal 106 travels at the (different) speed of light of the signal in the medium.

Figure 3:
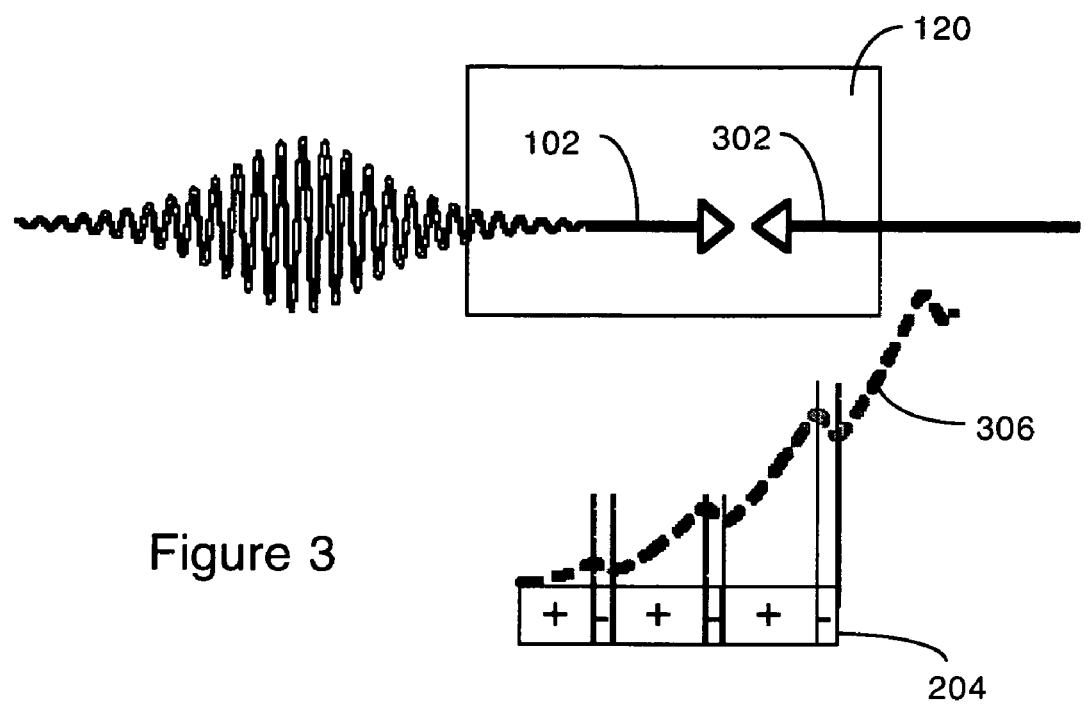
FIG. 3 is a diagram illustrating HHG with phase matching accomplished by a modulating pulse.

Note that the curve labeled 106 in FIG. 1, as well as the curve labeled 306 in FIG. 3 graph the amplitude of the respective HHG signal as it propagates. Thus, the x-axis for these curves corresponds to propagation distance through the medium, while the y-axis corresponds to the amplitude of the signal.

Hence, as indicated by output HHG signal 106, at first the HHG signal increases, but as the coherence length is reached destructive interference causes the signal to decrease. This process is repeated with a period of two coherence lengths, with the HHG beam being amplified in portions 108 of the waveform and the HHG beam being attenuated in portions 110 of the waveform. Hence, output HHG beam 106 will contain little HHG signal. The largest HHG signal would be obtained if the waveguide length corresponded to an odd number multiple of coherence lengths, but the HHG signal never gets very large.

Figure 2:
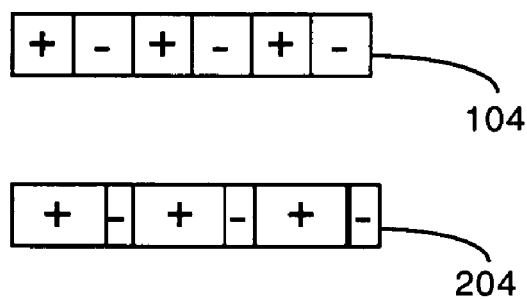
FIG. 2 is a schematic diagram illustrating how the coherence length within the HHG medium is modified by modifying the field seen by the driving pulse.
Figure 4:
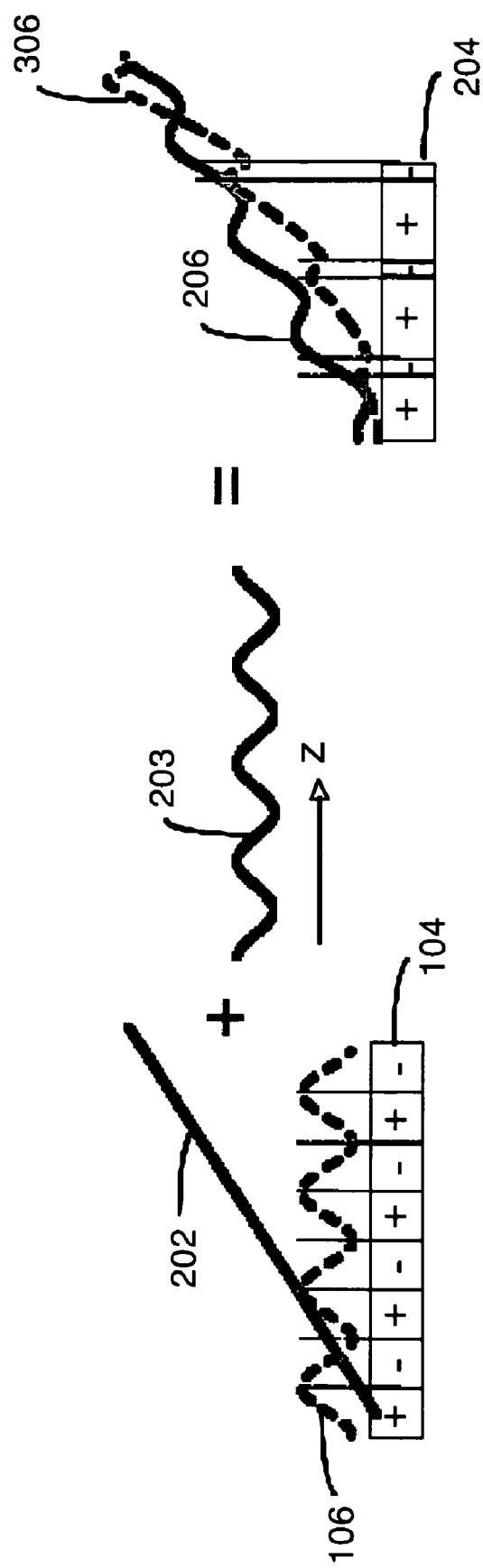
FIG. 4 is a schematic diagram illustrating how the combination of the medium dispersion and the continuously-varying shift in the phase of the emitted harmonics, which is induced by the modulating long pulse, results in modification of the effective coherence length within the nonlinear medium increasing the total conversion efficiency of light into higher harmonics.

FIGS. 2-4 are schematic diagrams illustrating the operation of the present invention. FIG. 2 illustrates the changes in coherence length within the medium that are caused by the addition of a modulating pulse. FIG. 3 shows the x-ray HHG output signal resulting from this change in coherence length.

FIG. 4 illustrates the process by which the combination of the medium dispersion and the continuously-varying shift in the phase of the emitted harmonics, which is induced by the modulating long pulse, results in modification of the effective coherence length within the nonlinear medium resulting in an increase in the total conversion efficiency of light into higher harmonics.

In HHG, the emitted high-order harmonic light in general exhibits a phase shift relative to the driving laser 102. This phase shift is a result of the re-scattering mechanism that results in high-harmonic emission. An electron ionized from an atom or molecule by the driving laser field begins to oscillate as a free electron under the influence of the laser field. But then it can re-encounter the atom or molecule from where it originated, and this collision results in emission of high harmonic light. The phase of the electron quantum wave function acquired by the electron along its femtosecond "boomerang" path under the influence of the laser field can be very large, reaching hundreds of radians. It is also related to the intensity of the laser. Thus, inducing a shallow sinusoidal (or other oscillatory waveform) modulation in the laser intensity along the propagation direction leads to sinusoidally-modulated phase-shift in the high harmonic generation at any particular wavelength of emission. A convenient way to induce such a sinusoidal modulation is by interfering the driving laser pulse 102 with a weak and long modulating pulse 302 that propagates in a different (non-collinear) direction. This modulating pulse 302 can also have a different wavelength from the driving laser pulse 102. The periodicity of the modulation is determined by the periodicity of the interference intensity grating between the driving laser and the modulating pulse, and therefore can be controlled, for example, by changing the wavelength or propagation direction of the modulated pulse. The spatial period (measured along the propagation direction of the driving laser) of this interference intensity grating should ideally correspond to an integer multiple of twice the coherence length of the high-harmonic process in the absence of the modulating pulse. The amplitude of the phase-shift modulation is determined by the amplitude of the intensity grating and therefore can be controlled by the intensity of the modulating beam. For example, the intensity of the modulated pulse is tuned such that the absolute value of mth-order Bessel function of the amplitude of the induced phase shift by the modulated pulse is largest.

In FIGS. 2 and 4, diagram 104 indicates the original coherence lengths from FIG. 1. Diagram 204 indicates the coherence lengths when a modulating pulse 302 affects the field seen by the driving pulse 102 according to the present invention. As diagram 204 shows, the areas of constructive interference are increased and the areas of destructive interference are decreased when the modulating pulse is used. FIG. 3 shows how the output HHG signal 306 is amplified because of the increased coherence lengths.

As indicated on the left side of FIG. 4, without the modulating pulse 302, the medium dispersion leads to linear growth in the phase shift 202 between the driving laser and the harmonic signal 106 which results in equal in-phase (+) and out-of-phase (−) coherent zones as shown in diagram 104, and thus a periodic increase and decrease of the HHG signal 106. The modulated pulse 302 induces a sinusoidal phase shift 203 in the phase of the emitted harmonics. The combination of the linear and sinusoidal phase shifts results in a stair-step type phase shift, 206, which leads to an increase of the effective length of the in-phase coherent zones and a decrease in the length of the effective out-of-phase coherent zones as shown in diagram 204, allowing the growth of the HHG signal 306. Calculations show that a single, long duration (many coherence lengths) modulating pulse can give rise to a phase matching efficiency factor of 0.3—significantly larger than is possible if the modulating pulse is used primarily to shut-off effective harmonic generation, as in Quasi Phase Matching.

Note that the curves labeled 202, 203, and 206 in FIG. 4 graph the phase changes applied to the HHG signal as it propagates. Thus, the y-axis for these curves corresponds to phase shift.

Expanding on this concept, complex phase shift structures can be induced by using multiple modulated pulses of varying frequencies, pulse shapes, and polarizations. It is possible to consider each modulated pulse as contributing a single Fourier component to the phase structure. That is, the interference between each modulated pulse and the driving laser leads to a sinusoidal phase-shift in the phase of the emitted harmonics. Thus, a complex phase structure in the HHG process will be induced by interfering multiple modulated pulses with the driving pulse, with each wave inducing a single Fourier component of the structure. Using multiple modulated pulses, 1D, 2D and even 3D lattices, quasi-lattices, random lattices, or other complex structures can be induced. Such structures may be used for enhanced phase matching or other spatio-temporal manipulation of coherent x-ray beams.

The periodic modulation of phase is used to correct for the periodic phase slip between the polarization of the medium created by the driving laser (that generates the harmonics), and the propagation of the harmonic radiation itself.

The profile of modulating pulse 302 (i.e. pulse shape) might be varied over the duration of the pulse to control the amount of phase shift of the polarization so that it optimizes phase matching at every point along the propagation of the driving pulse. The intensity of the modulating pulse affects the magnitude of the phase shift, while the phase or wavelength of modulating pulse 302 can be varied over its duration to optimize phase matching conditions. This can be done either by careful calculation, or it can be done adaptively, by varying the pulse shape and parameters in real time and optimizing the output.

The intensity of modulating pulse 302 can be very low (i.e. even as low as $10^{-6}$ or less of the driving pulse intensity). This means that, even though the modulating pulse must be long in duration, so that the driving and modulating pulses intersect over an extended propagation distance in the medium to phase-match over this length, the total energy required for modulating pulse 302 is quite moderate.

Driving pulse 102 is intense and ultrashort—preferably ~femtoseconds in duration. As an example, the driving pulse could be a 20 fs beam at about $5.5 \times 10^{15}$ W/cm$^2$, with a wavelength of 0.8 μm, about a 1-10 kHz repetition rate, and optionally chirped or shaped in time. In this example, the modulating beam is counter propagating and the interaction with the driving pulse occurs in a preformed cylindrical waveguide, 5 to 10 cm long, filled with doubly ionized Ne ions at 70 Torr pressure. The modulating pulse is on the order 10 cm long (around the length of the waveguide) with a wavelength of 1.6 mm, and intensity of $2.35 \times 10^9$ W/cm$^2$.

Figure 5:
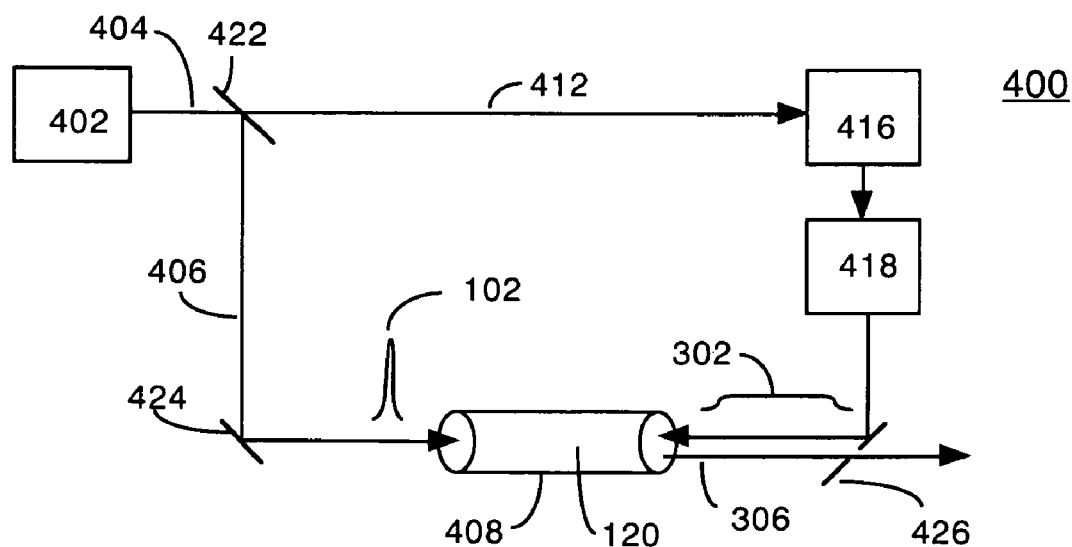
FIG. 5 is a block diagram illustrating a preferred embodiment of apparatus for accomplishing HHG with phase matching accomplished by a modulating long pulse.

FIG. 5 is a block diagram illustrating a preferred embodiment 400 of apparatus for accomplishing HHG with phase matching using a modulating pulse according to the present invention. In this embodiment, both the driving pulse 102 and the modulating pulse 302 are derived from pulses from the same laser 402, although this is not necessary. HHG is accomplished in a waveguide 408 containing HHG medium 120.

Laser output 404 is divided into beams 406 and 412 by beam splitter 422. Beam 406 is reflected toward waveguide 408 by mirror 424 and forms driving pulse 102. A compressor (not shown) would likely be used in this path to shorten pulse 102. Beam 412 is frequency converted in block 416, and pulse shaped in block 418. It is reflected from mirror 426 to form modulating beam 302. Mirror 426 has a hole allowing HHG beam 306 to pass through to where it is used.

The intense ultrashort driving pulse 102 incident from the left originates from an ultrashort pulse laser system 402. This beam generates coherent x-rays as it interacts with the gas or plasma 120, so that the x-rays also propagate from left to right along with the driving pulse 102. Modulating pulse 302, incident from the right, is also generated by a laser, but this might be a totally separate laser, or a separate "beamline" from the same ultrafast laser (as shown in this diagram). If a separate laser is used, frequency conversion 416 may not be needed. The two pulses must be synchronized to the extent that they "collide" within medium 120. The function of modulating beam 302 is to slightly perturb the coherent x-ray generation process that is driven by the driving pulse 102. The result of this slight perturbation is that the efficiency of the conversion process is increased by orders of magnitude.

This particular geometry at first looks like a difficult one to make work. The two beams 102, 302 are traveling in opposite directions, and the frequency conversion process driven by driving pulse 102 occurs as the beam propagates through the medium 120. Thus, if the modulating pulse 302 is to make a difference, it must be very long in duration since the two pulses must interact continuously as driving pulse 102 propagates through the medium. Fortunately, weak modulating pulse 302 is extremely efficient at perturbing the generation process. This is a direct result of the physics of the x-ray upconversion process. The result is that modulating pulse 302, although it must be relatively long in duration so that it overlaps with driving pulse 102 over an extended range, does not actually need all that much energy in it. A counterpropagating pulse with as little as 1/10 the energy of the driving laser pulse can result many orders of magnitude increase in the x-ray HHG yield 306.

Communication between intense driving pulse 102 and the modulating non-collinear weak pulse 302 is a direct result of the physics of the x-ray upconversion process. Coherent x-rays are generated when an atom (or ion or molecule) is illuminated by an intense laser, and the electromagnetic field of the laser gets strong enough to rip an electron out of the atom. Since the electromagnetic field of light is an oscillating wave, the liberated electron will respond by oscillating as well. Sometimes this electron can be driven back into the atom. When the electron slams into the atom, it can emit a high-energy photon.

This process is in some sense similar to what occurs in an x-ray tube in a doctor's office, and different in one critical way. In an x-ray tube, electrons are accelerated into a target, and when these electrons hit atoms in the target, the result is x-ray emission. In the case of a conventional medical x-ray tube, however, each one of these collision events is completely random, and the result is that the x-rays are emitted in random directions. In the case of the present invention, each atom is acting in response to the same intense laser, and the result is that all the atoms respond in the same way and radiate in unison with each other. The result is that the emission is much more directional. This process would result in a perfect, directional beam of x-rays if only the laser light and the x-rays traveled at exactly the same speed. Both x-rays and laser light travel at approximately the speed of light, but the index of refraction, which characterizes the speed of light, is slightly different at the (relatively long) laser wavelength and the (relatively short) x-ray wavelength.

In the scheme of the present invention, modulating pulse 302 traveling in the opposite direction of the HHG propagation just slightly perturbs the trajectory that the electron takes. This results in a modulation of the exact phase of the emission of the x-rays, and this modulation can be used to correct for the slightly different index of refraction of the two colors (of the driving pulse and HHG).

While the exemplary preferred embodiments of the present invention are described herein with particularity, those skilled in the art will appreciate various changes, additions, and applications other than those specifically mentioned, which are within the spirit of this invention.

What is claimed is:

1. The method of generating coherent x-ray emissions comprising the steps of:
   (a) providing a medium for high harmonic generation (HHG);
   (b) focusing a femtosecond driving pulse into the medium to cause high-harmonic generation (HHG) upconversion of the light to shorter wavelengths;
   (c) focusing a long duration modulating pulse, non-collinear to the driving pulse, into the medium such that the driving pulse and the modulating pulse interact within the medium; and
   (d) selecting the propagation direction, frequency and amplitude of the modulating pulse such that the modulating pulse modulates the phase of the high harmonic emission and improves the phase matching of the HHG by increasing areas of constructive interference between the driving pulse and the generated HHG.

2. The method of claim 1, wherein the step of providing a medium comprises the step of providing a gas within an enclosed volume.

3. The method of claim 2, wherein the step of providing a medium comprises the step of providing a noble gas within an enclosed volume.

4. The method of claim 2 wherein the enclosed volume is a waveguide.

5. The method of claim 4 wherein the enclosed volume is a cylindrical waveguide.

6. The method of claim 5 wherein the enclosed volume is a preformed cylindrical plasma waveguide.

7. The method of claim 4 wherein the enclosed volume is a planar waveguide.

8. The method of claim 1 wherein the driving pulse and the modulating pulse interact over a distance of many coherence lengths of the HHG process.

9. The method of claim 8 wherein the modulating pulse is at least a millimeter.

10. The method of claim 8 wherein the intensity of the modulating pulse is on the order of $10^{-6}$ of the intensity of the driving pulse.

11. The method of claim 8 wherein step (d) further includes the step of varying the amplitude of the modulating pulse over the duration of the pulse in order to improve the phase matching.

12. The method of claim 8 wherein step (d) further includes the step of varying the phase of the modulating pulse over the duration of the pulse in order to improve the phase matching.

13. The method of claim 8 wherein step (d) further includes the step of varying the frequency of the modulating pulse over the duration of the pulse in order to improve the phase matching.

14. The method of claim 8 wherein the energy in the modulating pulse is on the order of 1/10 the energy of the driving pulse.

15. The method of claim 8 wherein the driving pulse is on the order of 20 fs, with a wavelength of about 0.8 μm, and peak intensity of about $5.5 \times 10^{15}$ W/cm$^2$.

16. The method of claim 8 wherein the medium is doubly ionized Ne ions at a pressure of about 70 Torr.

17. The method of claim 8, wherein the modulating pulse has a wavelength on the order of 1.6 μm and a peak intensity on the order of $2.35 \times 10^9$ W/cm$^2$.

18. The method of claim 1 where the modulating pulse consists of a combination of pulses.

19. The method of claim 1 wherein a periodic interference intensity grating between the driving laser and the modulating pulse is formed, and wherein spatial period (measured along the propagation direction of the driving laser) of this interference intensity grating approximately corresponds to an integer multiple of twice a coherence length of a high-harmonic generation process in the absence of the modulating pulse.

20. The method of claim 1 further including the step of tuning the intensity of the modulating pulse over the duration of the modulating pulse such that the absolute value of an mth-order Bessel function of the amplitude of the phase modulation is maximized.

21. Apparatus for generating coherent x-ray emissions comprising:

an enclosed volume filled with a gas;

means for producing a femtosecond driving pulse;

means for focusing the driving pulse into the gas to cause high-harmonic generation (HHG), in the X-ray region of the spectrum;

means for generating a long-duration modulating pulse;

means for focusing the modulating pulse into the gas, not collinear with the driving pulse, such that it interacts with the driving pulse within the gas; and means for selecting the propagation direction, frequency and amplitude of the modulating pulse such that the modulating pulse modulates the phase of the high harmonic emission and improves the phase matching of the HHG by increasing areas of constructive interference between the driving pulse and the HHG.

22. The apparatus of claim 21, wherein the gas is a noble gas.

23. The apparatus of claim 21 wherein the enclosed volume is a waveguide.

24. The apparatus of claim 22 wherein the enclosed volume is a preformed cylindrical plasma waveguide.

25. The apparatus of claim 21 wherein the means for generating the modulating pulse includes means for modifying one of the following aspects of the modulating pulse over the duration of the pulse:

amplitude;

phase; or frequency.

* * * * *